US009681188B2

(12) United States Patent
Park et al.

(10) Patent No.: US 9,681,188 B2
(45) Date of Patent: Jun. 13, 2017

(54) DISPLAY DEVICE AND OPERATING METHOD THEREOF

(71) Applicant: LG ELECTRONICS INC., Seoul (KR)

(72) Inventors: Wonbae Park, Seoul (KR); Sewon Park, Seoul (KR); Hyeongchul Oh, Seoul (KR); Eunyul Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/477,506

(22) Filed: Sep. 4, 2014

(65) Prior Publication Data
US 2015/0373412 A1 Dec. 24, 2015

(30) Foreign Application Priority Data

Jun. 20, 2014 (KR) ........................ 10-2014-0075933

(51) Int. Cl.
| | | |
|---|---|---|
| *H04N 21/24* | (2011.01) | |
| *H04N 21/25* | (2011.01) | |
| *H04N 21/258* | (2011.01) | |
| *H04N 21/418* | (2011.01) | |

(Continued)

(52) U.S. Cl.
CPC ..... *H04N 21/4667* (2013.01); *G06K 9/00288* (2013.01); *H04N 21/4122* (2013.01); *H04N 21/4126* (2013.01); *H04N 21/4223* (2013.01); *H04N 21/4333* (2013.01); *H04N 21/43615* (2013.01); *H04N 21/43637* (2013.01); *H04N 21/4415* (2013.01); *H04N 21/44218* (2013.01);
(Continued)

(58) Field of Classification Search
CPC ............ H04N 21/4667; H04N 21/462; H04N 21/44218; H04N 21/4223; H04N 21/4532
See application file for complete search history.

(56) References Cited

U.S. PATENT DOCUMENTS

2005/0166258 A1* 7/2005 Vasilevsky ............ G11B 27/00
    725/138
2010/0122277 A1 5/2010 Fonseca
(Continued)

FOREIGN PATENT DOCUMENTS

| EP | 1843591 A1 | 10/2007 |
|---|---|---|
| WO | WO 2011/037761 A1 | 3/2011 |
| WO | WO 2013/126041 A1 | 8/2013 |

*Primary Examiner* — Brian T Pendleton
*Assistant Examiner* — Jean D Saint Cyr
(74) *Attorney, Agent, or Firm* — Birch, Stewart, Kolasch & Birch, LLP

(57) ABSTRACT

A method for operating a display device according to an embodiment includes acquiring an image of a plurality of users, recognizing a plurality of faces respectively corresponding to the plurality of users from the acquired image, checking a viewing state of media content for each user, when the plurality of users respectively corresponding to the plurality of recognized faces are registered users, acquiring viewing information corresponding to at least one of the plurality of registered users of which the viewing state has been changed from a viewing maintaining state in which the media content is viewed to a not-viewing state in which the media content is not viewed, and performing a re-viewing function on the basis of the acquired viewing information when a face of the user of which the viewing state has been changed is re-recognized.

15 Claims, 21 Drawing Sheets

(51) Int. Cl.
  *H04N 21/422* (2011.01)
  *H04N 21/441* (2011.01)
  *H04N 21/4415* (2011.01)
  *H04N 21/442* (2011.01)
  *H04N 21/466* (2011.01)
  *H04N 21/41* (2011.01)
  *H04N 21/433* (2011.01)
  *H04N 21/436* (2011.01)
  *H04N 21/4363* (2011.01)
  *H04N 21/488* (2011.01)
  *G06K 9/00* (2006.01)
  *H04N 21/4223* (2011.01)
  *H04N 21/45* (2011.01)
  *H04N 21/462* (2011.01)
  *H04N 21/472* (2011.01)

(52) U.S. Cl.
  CPC ....... *H04N 21/4532* (2013.01); *H04N 21/462* (2013.01); *H04N 21/47217* (2013.01); *H04N 21/4882* (2013.01)

(56) References Cited

U.S. PATENT DOCUMENTS

| | | | |
|---|---|---|---|
| 2010/0295839 A1* | 11/2010 | Nagaya | G06F 1/3265 345/212 |
| 2011/0274405 A1 | 11/2011 | Godar | |
| 2012/0020641 A1 | 1/2012 | Sakaniwa et al. | |
| 2012/0224043 A1* | 9/2012 | Tsurumi | H04N 21/4223 348/78 |
| 2013/0011114 A1* | 1/2013 | Tashiro | G11B 27/105 386/230 |
| 2013/0212606 A1* | 8/2013 | Kannan | H04N 21/4667 725/12 |
| 2014/0075528 A1* | 3/2014 | Matsuoka | G06F 21/32 726/7 |
| 2014/0282666 A1* | 9/2014 | Comstock | H04N 21/252 725/18 |
| 2014/0373077 A1 | 12/2014 | Rumreich | |
| 2015/0082347 A1* | 3/2015 | Pan | H04N 21/4126 725/38 |

* cited by examiner

FIG. 22
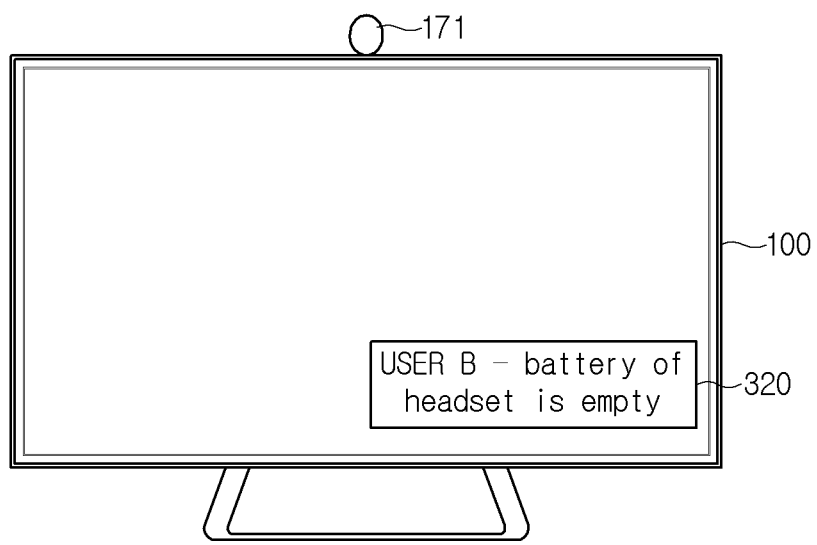
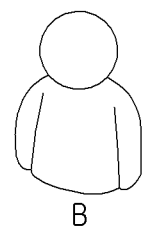

FIG. 25
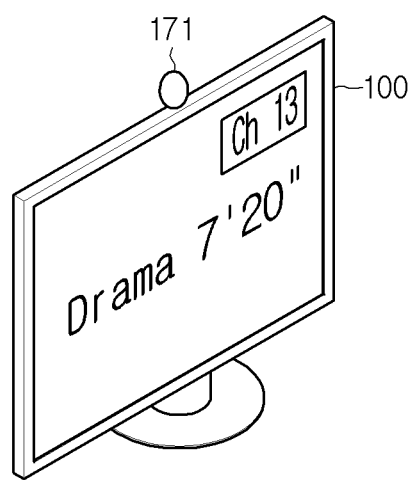
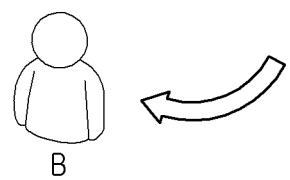

DISPLAY DEVICE AND OPERATING METHOD THEREOF

CROSS-REFERENCE TO RELATED APPLICATIONS

This application claims the benefit of Korean Patent Application No. 10-2014-0075933, filed on Jun. 20, 2014 entitled "DISPLAY DEVICE AND OPERATING METHOD THEREOF", which is hereby incorporated by reference in its entirety into this application.

BACKGROUND

The present disclosure relates to a display device and a method for operating the same.

A digital TV service using a wired or wireless communication network has recently become common. The digital TV service may provide various services that a conventional analog broadcasting service is unable to provide.

For example, an Internet protocol television (IPTV) service which is a type of the digital TV service provides interactivity so as to enable a user to actively select a program type, a viewing time, etc. Based on the interactivity, the IPTV service may provide various additional services such as an Internet search service, a home shopping service, an online game service and the like.

Furthermore, recent digital TVs may provide user-customized services for providing preferred channels and programs for each user.

However, users should log on to or log out from TVs using IDs and passwords, and thus may experience inconvenience.

SUMMARY

Embodiments provide a display device for providing a customized service to a user through a face recognition process without requiring additional manipulation of a remote controller or an additional login or logout process, and a method for operating the same.

In one embodiment, a method for operating a display device includes acquiring an image of a plurality of users, recognizing a plurality of faces respectively corresponding to the plurality of users from the acquired image, checking a viewing state of media content for each user, when the plurality of users respectively corresponding to the plurality of recognized faces are registered users, acquiring viewing information corresponding to at least one of the plurality of registered users of which the viewing state has been changed from a viewing maintaining state in which the media content is viewed to a not-viewing state in which the media content is not viewed, and performing a re-viewing function on the basis of the acquired viewing information when a face of the user of which the viewing state has been changed is re-recognized.

In another embodiment, a display device includes a display unit, a camera unit configured to acquire an image of a plurality of users, and a control unit configured to recognize a plurality of faces respectively corresponding to the plurality of users from the acquired image, check a viewing state of media content for each user, when the plurality of users respectively corresponding to the plurality of recognized faces are registered users, acquire viewing information corresponding to at least one of the plurality of registered users of which the viewing state has been changed from a viewing maintaining state in which the media content is viewed to a not-viewing state in which the media content is not viewed, and perform a re-viewing function on the basis of the acquired viewing information when a face of the user of which the viewing state has been changed is re-recognized.

According to various embodiments, a customized service may be easily provided to a user through a face recognition process without requiring the user to additionally manipulate a remote controller or perform a login or logout process.

Furthermore, the user may easily view media content from a time point at which the user most recently viewed the media content by virtue of the face recognition process without additionally manipulating a remote controller or inputting a signal through the remote controller.

The details of one or more embodiments are set forth in the accompanying drawings and the description below. Other features will be apparent from the description and drawings, and from the claims.

BRIEF DESCRIPTION OF THE DRAWINGS

FIGS. 19 to 22 are diagrams illustrating an example in which a customized service is provided on the basis of the viewing state of the user according to another embodiment.

FIGS. 23 to 26 are diagrams illustrating an example in which a customized service is provided on the basis of the viewing state of the user according to another embodiment.

DETAILED DESCRIPTION OF THE EMBODIMENTS

Hereinafter, embodiments will be described in detail with reference to the accompanying drawings. In the following description, the terms "module" and "unit" for referring to elements are assigned thereto and used exchangeably in consideration of convenience of explanation, and thus, the terms per se not necessarily represent different meanings or functions.

A display device according to an embodiment, which is, e.g., an intelligent display device having both a broadcast receiving function and a computer support function, is devoted to the broadcast receiving function but also has an Internet search function, so that easy-to-use interfaces such as a handwriting-type input device, a touch screen, or a spatial remote controller may be provided. Furthermore, with a wire/wireless Internet function, the intelligent display device may be connected to the Internet or a computer, so that functions such as electronic mail sending, web browsing, banking, or gaming may be performed. For such various functions, a standardized general OS may be used.

Therefore, various user-friendly functions may be performed in the display device described herein since various applications are allowed to be freely added to or deleted from a general OS kernel. For example, the display device may be a network TV, an HBBTV, a smart TV, an LED TV, or an OLED TV, or may be applied to a smartphone.

Figure 1:
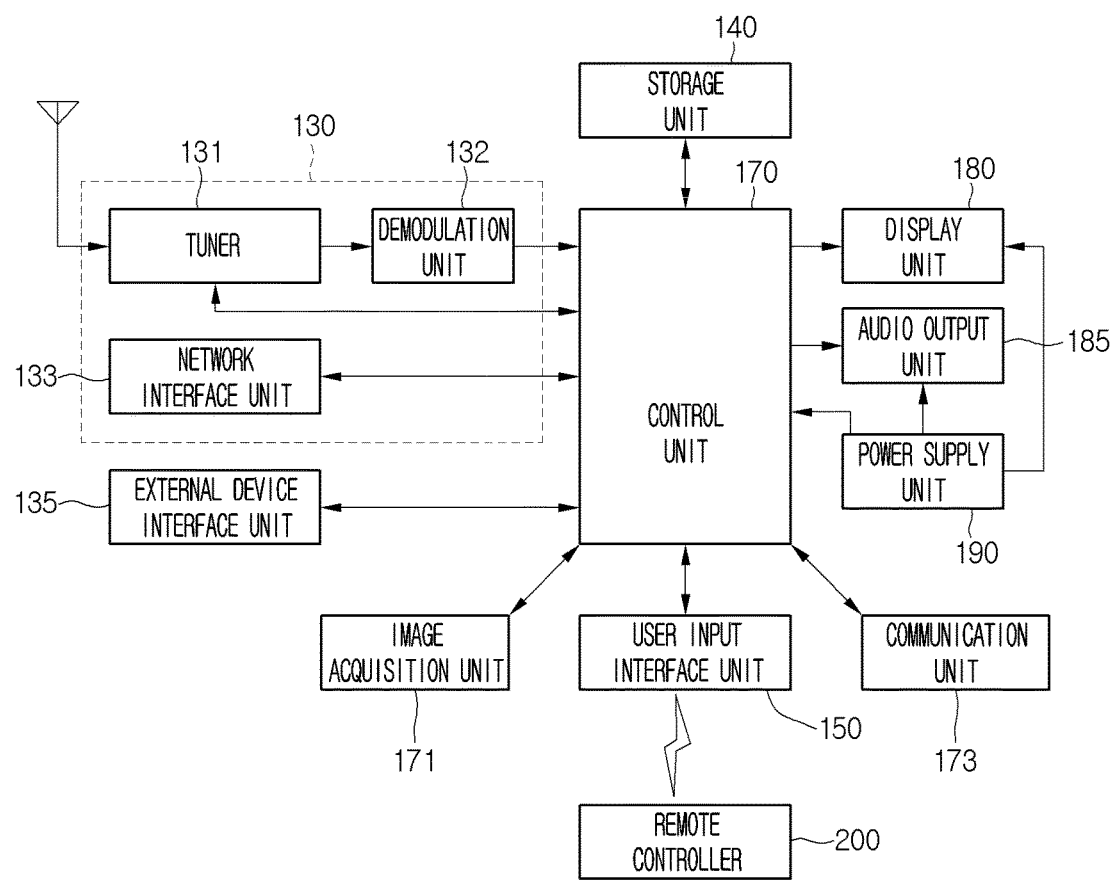
FIG. 1 is a block diagram illustrating a display device according to an embodiment.

FIG. 1 is a block diagram illustrating a display device according to an embodiment.

Referring to FIG. 1, a display device 100 may include a broadcast receiving unit 130, an external device interface unit 135, a storage unit 140, a user input interface unit 150, a control unit 170, an image acquisition unit 171, a communication unit 173, a display unit 180, an audio output unit 185, and a power supply unit 190.

The broadcast receiving unit 130 may include a tuner 131, a demodulation unit 132, and a network interface unit 133.

The tuner 131 may select a specific broadcast channel according to a channel selection command. The tuner 131 may receive a broadcast signal of the selected specific broadcast channel.

The demodulation unit 132 may separate a video signal, an audio signal and a data signal related to a broadcast program from the received broadcast signal, and may restore the separated video signal, audio signal and data signal in an output enabling form.

The external device interface unit 135 may receive an application or an application list in an adjacent external device and may transfer the received application or application list to the storage unit 170 or the storage unit 140.

The network interface unit 133 may provide an interface for connecting the display device 100 to a wired/wireless network including an Internet network. The network interface unit 133 may transmit/receive data to/from another user or another electronic device through a connected network or another network linked to the connected network.

The network interface unit 133 may transmit a part of content data stored in the display device 100 to a user or electronic device selected from among other users or other electronic devices pre-registered in the display device 100.

The network interface unit 133 may access a certain webpage through the connected network or another network linked to the connected network. That is, the network interface unit 133 may access the certain webpage through the network so as to transmit/receive data to/from a corresponding server.

Furthermore, the network interface unit 133 may receive content or data provided by a content provider or a network operator. That is, the network interface unit 133 may receive, through the network, content such as a movie, an advertisement, a game, a VOD or a broadcast signal provided by the content provider or the network operator and information related to the content.

Furthermore, the network interface unit 133 may receive firmware update information and an update file provided by the network operator, and may transmit data to an Internet or content provider or the network operator.

The network interface unit 133 may select a desired application from among publicly open applications and may receive the selected application through the network.

The storage unit 140 may store a program for processing and controlling signals in the control unit 170 and may store signal-processed images, sounds or data signals.

Furthermore, the storage unit 140 may perform a function for temporarily storing images, sounds or data signals received from the external device interface unit 135 or the network interface unit 133, and may store information on a certain image using a channel memory function.

The storage unit 140 may store the application or the application list received from the external device interface unit 135 or the network interface unit 133.

The display device 100 may play a content file (a moving image file, a still image file, a music file, a document file, or an application file) stored in the storage unit 140 to provide the content file to a user.

The user input interface unit 150 may transfer a signal input by the user to the control unit 170, or may transfer a signal from the control unit 170 to the user. For example, the user input interface unit 150 may receive control signals such as a power on/off signal, a channel selection signal or a screen setting signal from a remote controller 200 to process the control signals according to various communication schemes such as a Bluetooth communication scheme, an ultra wideband (WB) communication scheme, a ZigBee communication scheme, a radio frequency (RF) communication scheme or an infrared (IR) communication scheme, or may allow a control signal from the control unit 170 to be transmitted to the remote controller 200.

Furthermore, the user input interface unit 150 may transfer, to the control unit 170, control signals input from local keys (not illustrated) such as a power key, a volume key, a channel key and a setting key.

An image signal obtained by performing image processing in the control unit 170 may be input to the display unit 180 so as to be displayed as an image corresponding to the image signal. Furthermore, the image signal obtained by performing image processing in the control unit 170 may be input to an external output device through the external device interface unit 135.

A sound signal processed in the control unit 170 may be output to the audio output unit 185. Furthermore, the sound signal processed in the control unit 170 may be input to an external output device through the external device interface unit 135.

The control unit 170 may control overall operation of the display device 100.

The control unit 170 may control the display device 100 using a user command input through the user input interface unit 150 or an internal program, and may access a network so as to allow an application or an application list desired by the user to be downloaded to the display device 100.

The control unit 170 may allow channel information selected by the user to be output together with a processed image or sound signal through the display unit 180 or the audio output unit 185.

The control unit 170 may allow an image signal or a sound signal of an external device, e.g., a camera or a camcorder, input through the external device interface unit 135 to be output through the display unit 180 or the audio output unit 185, according to an external device image playback command received through the user input interface unit 150.

The control unit 170 may control the display unit 180 so that an image is displayed. For example, the control unit 170 may control the display unit 180 so that a broadcast image input through the tuner 131, an external input image input through the external device interface unit 135, an image input through the network interface unit 133, or an image stored in the storage unit 140 to be displayed on the display unit 180. In this case, the image displayed on the display unit 180 may be a still image or a moving image, or may be a 2D image or a 3D image.

Furthermore, the control unit 170 may allow content stored in the display device 100, received broadcast content, or externally input content to be played, wherein the played content may be various types of content such as a broadcast image, an externally input image, an audio file, a still image, an accessed web screen, and a document file.

The image acquisition unit 171 may acquire an image of the user. The image acquisition unit 171 may include a camera. The image acquisition unit 171 may include various devices capable of shooting images, such as a digital camera, a CMOS camera, a charged coupled device (CCD) camera and a TOF camera, or various sensor devices capable of monitoring subjects.

The communication unit 173 may exchange information with a peripheral device such as a mobile terminal of the user. The communication unit 173 may exchange information with the peripheral device by means of short-range wireless communication. Here, the short-range wireless communication may be based on one of wireless communication standards such as Bluetooth, Wi-Fi and ZigBee, but is not limited thereto.

The display unit 180 may convert an image signal, a data signal or an OSD signal processed in the control unit 170 or an image signal or a data signal received by the external device interface unit 135 into R, G, B signals so as to generate a driving signal.

The display device 100 illustrated in FIG. 1 is merely an example, and thus, some of the elements of the display device 100 illustrated in FIG. 1 may be combined or omitted or other elements may be added.

That is, two or more elements may be combined into a single element or a single element may be separated into two or more elements, as necessary. Functions performed in each block are merely examples for describing an embodiment, and thus, the specific operations or elements of each block do not limit the scope of the present disclosure.

According to another embodiment, unlike the configuration illustrated in FIG. 1, the display device 100 may not be provided with the tuner 131 and the demodulation unit 132 and may receive and play images through the network interface unit 133 or the external device interface unit 135.

For example, the display device 100 may be divided into an image processing device such as a set-top box for receiving broadcast signals or content provided by various network services and a content playback device for playing content input from the image processing device.

In this case, a display device operating method according to an embodiment may be performed by not only the display device 100 described above with reference to FIG. 1 but also one of the image processing device such as a set-top box and the content playback device provided with the display unit 180 and the audio output unit 185.

A remote controller according to an embodiment will be described with reference to FIGS. 2 and 3.

Figure 2:
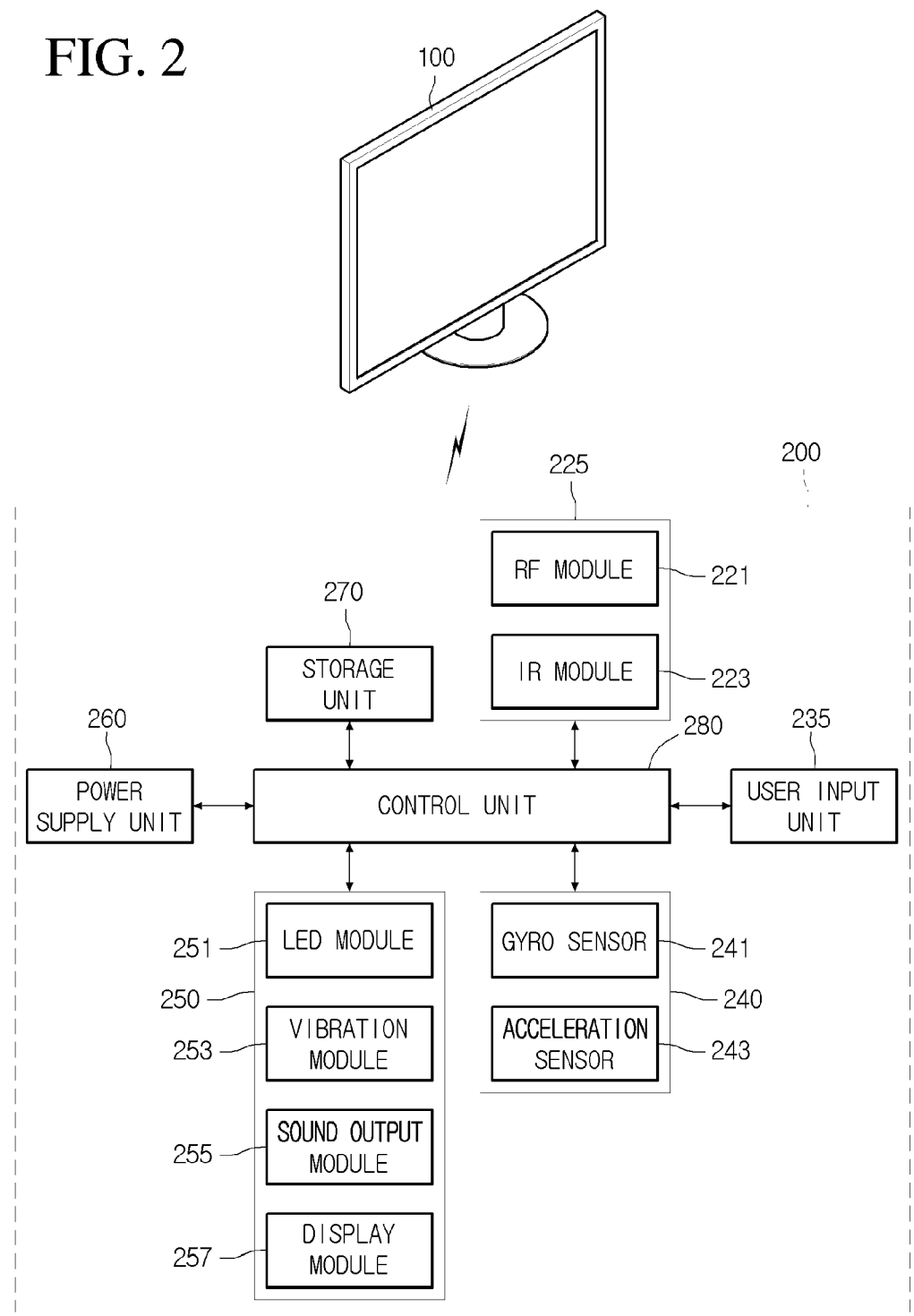
FIG. 2 is a block diagram illustrating a remote controller according to an embodiment.
Figure 3:
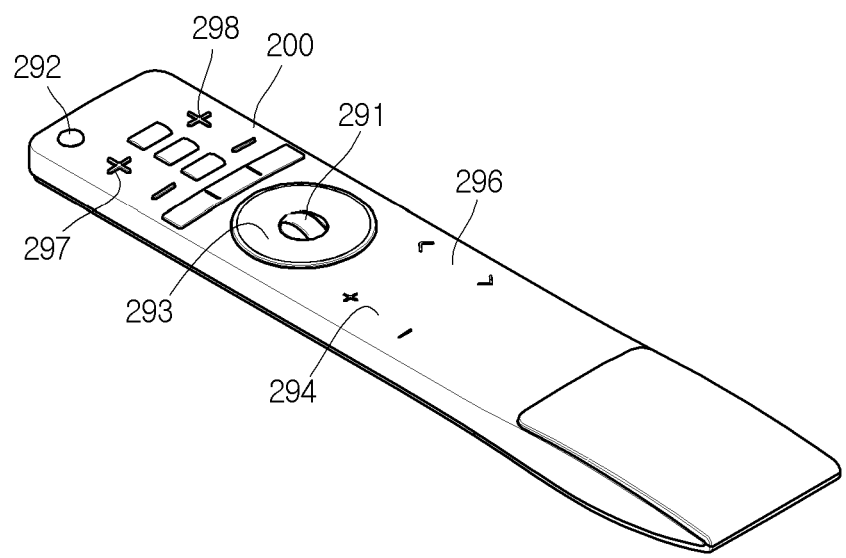
FIG. 3 illustrates an actual view of a remote controller according to an embodiment.

FIG. 2 is a block diagram illustrating the remote controller 200 according to an embodiment, and FIG. 3 illustrates an actual view of the remote controller 200 according to an embodiment.

Referring to FIG. 2, the remote controller 200 may include a wireless communication unit 225, a user input unit 235, a sensor unit 240, an output unit 250, a power supply unit 260, a storage unit 270 and a control unit 280.

Referring to FIG. 2, the wireless communication unit 225 transmits/receives signals to/from any one of the above-mentioned display devices according to embodiments.

The remote controller 200 may be provided with an RF module 221 for transmitting/receiving signals to/from the display device 100 according to an RF communication standard and an IR module 223 for transmitting/receiving signals to/from the display device 100 according to an IR communication standard.

The remote controller 200 transmits a signal containing information on a motion of the remote controller 200 to the display device 100 through the RF module 221.

Furthermore, the remote controller 200 may receive, through the RF module 221, a signal transmitted by the display device 100, and may transmit, as necessary, a command for turning on/off power, changing a channel or adjusting a volume to the display device 100 through the IR module 223.

The user input unit 235 may include a keypad, a button, a touchpad or a touchscreen. The user may manipulate the user input unit 235 so as to input a command related to the display device 100 to the remote controller 200. In the case where the user input unit 235 is provided with a hard key button, the user may input the command related to the display device 100 to the remote controller 200 by pushing the hard key button.

In the case where the user input unit 235 is provided with a touchscreen, the user may input the command related to the display device 100 to the remote controller 200 by touching a soft key on the touchscreen. Furthermore, the user input unit 235 may be provided with various input units to be manipulated by the user, such as a scroll key and a jog key, but the present disclosure is not limited thereto.

The sensor unit 240 may be provided with a gyro sensor 241 or an acceleration sensor 243, wherein the gyro sensor 241 may sense information on a motion of the remote controller 200.

For example, the gyro sensor 241 may sense the information on the motion of the remote controller 200 with respect to x, y and z axes, and the acceleration sensor 243 may sense information on a moving speed of the remote controller 200. The remote controller 200 may be further provided with a distance measurement sensor so as to measure a distance to the display unit 180 of the display device 100.

The output unit 250 may output an image or sound signal corresponding to manipulation of the user input unit 235 or a signal transmitted from the display device 100. The user may recognize whether the user input unit 235 is manipulated or the display device 100 is controlled, by means of the output unit 250.

For example, the output unit 250 may be provided with an LED module 251, a vibration module 253, a sound output module 255 or a display module 257 which emit light, generate vibration, output a sound or output an image when the user input unit 235 is manipulated or a signal is transmitted/received to/from the display device 100 through the wireless communication unit 225.

The power supply unit 260 may supply power to the remote controller 200, and may block the supply of power when the remote controller 200 does not move for a predetermined period of time. The power supply unit 260 may resume the supply of power when a predetermined key of the remote controller 200 is manipulated.

The storage unit 270 may store various programs and application data required for controlling or operating the remote controller 200. In the case where the remote controller 200 wirelessly transmits/receives signals to/from the display device 100 through the RF module 221, the remote controller 200 and the display device 100 transmit/receive signals at a predetermined frequency band.

The remote controller 200 may store, in the storage unit 270, information on a frequency band at which signals are able to be transmitted/received to/from the display device 100 paired with the remote controller 200, and may refer to the information.

The control unit 280 controls overall control operation of the remote controller 200. The control unit 280 may transmit a signal corresponding to manipulation of a predetermined key of the user input unit 235 or a signal corresponding to a motion of the remote controller 200 sensed by the sensor unit 240 to the display device 100 through the communication unit 225.

Next, FIG. 3 is described.

FIG. 3 illustrates an actual view of a remote controller according to an embodiment.

Referring to FIG. 3, for example, the spatial remote controller 200 may be provided with an okay key 291, a menu key 292, a four directional key 293, a channel adjusting key 294, and a volume adjusting key 296. For example, the okay key 291 may be used when a menu or an item is selected, the menu key 292 may be used to display a predetermined menu, the four directional key 293 may be used to move a pointer or an indicator vertically or horizontally, the channel adjusting key 294 may be used to switch channels, and the volume adjusting key 296 may be used to adjust a volume.

The spatial remote controller 200 may be further provided with a back key 297 and a home key 298. For example, the back key 297 may be used to move to a previous screen, and the home key 298 may be used to move to a home screen.

As illustrated in the drawing, a scroll function may be added to the okay key 291. To this end, the okay key 291 may be implemented in the form of a wheel key. That is, a corresponding menu or item may be selected by pressing the okay key 291, and display screen scrolling or list page switching may be performed by scrolling the okay key 291 upward or downward.

In detail, if the okay key 291 is scrolled while an image that is greater than a display is displayed on the display unit 180, a region of the image which is not currently shown is displayed on the display.

For another example, if the okay key 291 is scrolled when a list page is displayed on the display unit 180, a previous page or a next page of a current page may be displayed. Such a scroll function may be provided to an additional key other than the okay key 291.

As illustrated in the drawing, the four directional key 293 may have the shape of a circle on which up, down, left and right keys may be arranged in four directions respectively. The four directional key 293 may be able to receive a touch input. For example, when a touch motion is performed on from the up key to the down key in the four directional key 293, a set function may be input or performed according to the touch input.

Figure 4:
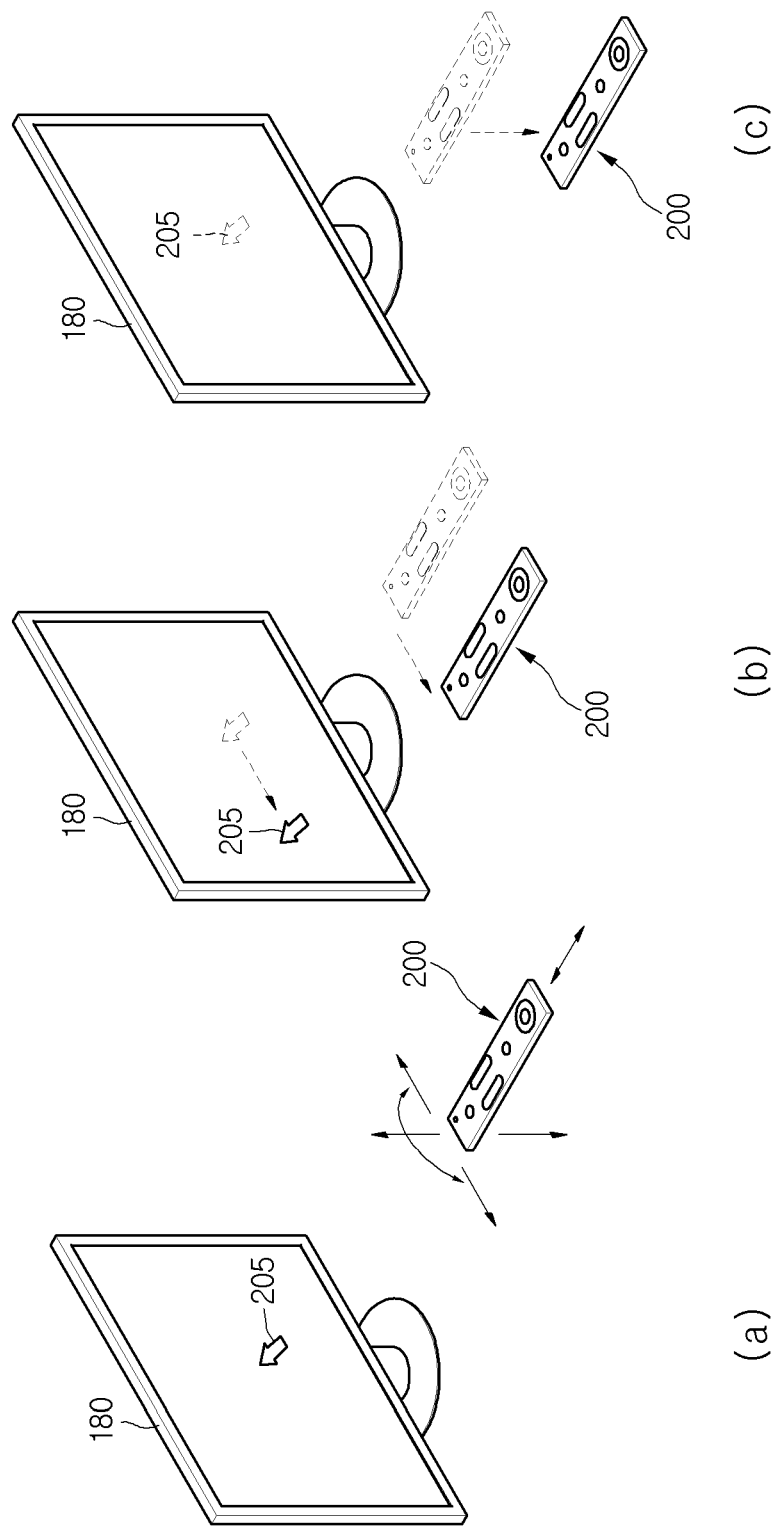
FIG. 4 illustrates an example of using a remote controller according to an embodiment.

Next, FIG. 4 is described.

FIG. 4 illustrates an example of using a remote controller according to an embodiment.

FIG. 4A illustrates an example in which a pointer 205 corresponding to the remote controller 200 is displayed on the display unit 180.

The user may move the remote controller 200 vertically or horizontally or may rotate the remote controller 200. The pointer 205 displayed on the display unit 180 of the display device 100 responds to a motion of the remote controller 200. As illustrated in the drawing, the pointer 205 is moved and displayed according to the motion of the remote controller 200 in a 3D space. Therefore, the remote controller 200 may be referred to as a spatial remote controller.

FIG. 4B illustrates an example in which, when the user moves the remote controller 200 leftward, the pointer 205 displayed on the display unit 180 of the display device 100 is moved leftward in response to the movement of the remote controller 200.

Information on the motion of the remote controller 200 detected by a sensor of the remote controller 200 is transmitted to the display device 100. The display device 100 may calculate coordinates of the pointer 205 from the information on the motion of the remote controller 200. The display device 100 may display the pointer 205 so that the pointer 205 corresponds to the calculated coordinates.

FIG. 4C illustrates an example in which the user moves the remote controller 200 away from the display unit 180 while pressing a specific button of the remote controller 200. In response to the movement of the remote controller 200, a selection region on the display unit 180 corresponding to the pointer 205 may be zoomed in so as to be magnified and displayed.

On the contrary, when the user moves the remote controller 200 towards the display unit 180, the selection region on the display unit 180 corresponding to the pointer 205 may be zoomed out so as to be reduced and displayed.

Alternatively, the selection region may be zoomed out when the remote controller 200 is moved away from the display unit 180, and the selection region may be zoomed in when the remote controller 200 is moved towards the display unit 180.

Furthermore, the recognition of the vertical or horizontal movement of the remote controller 200 may be disabled while a specific button of the remote controller 200 is pressed. That is, when the remote controller 200 is moved away from or towards the display unit 180, the vertical or horizontal movement of the remote controller 200 may not be recognized, but the forward or backward movement of the remote controller 200 may be recognized. When the specific button of the remote controller 200 is not pressed, the pointer 205 is moved according to the vertical or horizontal movement of the remote controller 200.

A moving speed or a moving direction of the pointer 205 may correspond to a moving speed or a moving direction of the remote controller 200.

The pointer of the present disclosure represents an object displayed on the display unit 180 in response to a motion of the remote controller 200. Therefore, objects having various shapes other than the arrow shape illustrated in the drawing may be used as the pointer 205. For example, the object may include a dot, a cursor, a prompt or a thick outline. Furthermore, the pointer 205 may correspond to any one point on one of a horizontal axis and a vertical axis on the display unit 180 so as to be displayed, and may also correspond to a plurality of points on a line or a surface so as to be displayed.

A method for operating the display device 100 according to an embodiment will be described with reference to FIG. 5.

Figure 5:
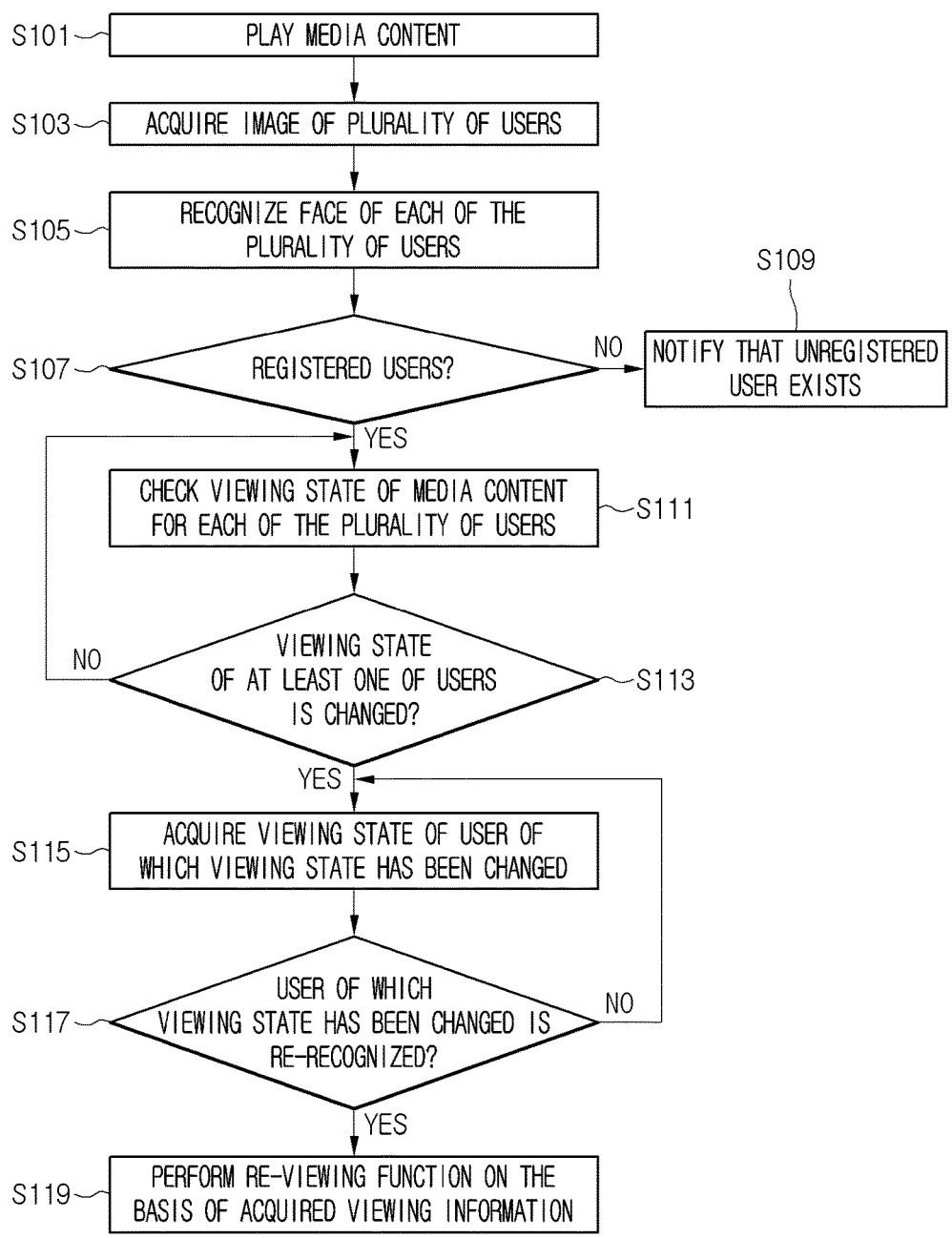
FIG. 5 is a flowchart illustrating a method for operating a display device according to an embodiment.

FIG. 5 is a flowchart illustrating the method for operating the display device according to an embodiment.

The control unit 170 of the display device 100 plays media content through the display unit 180 according to a request for playing the media content (operation S101).

In one embodiment, the media content may be one of a moving image, an image and an audio. In the case where the media content is a moving image, the media content may be one of a broadcast program, a video on demand (VOD) and a digital versatile disc (DVD) file.

While the media content is played, the image acquisition unit 171 of the display device 100 acquires an image of a plurality of users located in front of the display device 100 (operation S103).

In one embodiment, the image acquisition unit 171 may include a camera, wherein the camera may obtain the image of the plurality of users in front of the display device 100. The camera may be arranged at the top of the display device 100 to acquire the image of the users, or may be arranged at the left, the right or the bottom of the display device 100.

In another embodiment, the camera may exist as a separate element without being included in the display device 100.

The control unit 170 of the display device 100 recognizes a plurality of faces corresponding to the plurality of users from the acquired image (operation S105).

The control unit 170 may extract a plurality of face regions corresponding to the plurality of users from the image acquired by the image acquisition unit 171, and may recognize the plurality of faces using the plurality of extracted face regions.

In one embodiment, the control unit 170 may distinguish face colors of the users from background colors so as to extract the face regions of the users.

In another embodiment, the control unit 170 may extract the face regions of the users using locations or shapes of eyes, noses, mouths, ears and hairs of the users.

The control unit 170 of the display device 100 checks whether the plurality of users corresponding to the recognized faces are registered users (operation S107).

In one embodiment, a registered user may be a user having a right to use the functions of the display device 100, and an unregistered user may be a user not having the right to use the functions of the display device 100. The user may perform a registration process using user identification information such as an electronic mail, a phone number, an ID and a password.

In one embodiment, the storage unit 140 may store face images of registered users and identification information corresponding to the faces of the users. The control unit 170 may compare the plurality of recognized faces with the face images stored in the storage unit 140. The control unit 170 may determine whether the plurality of users corresponding to the plurality of recognized faces are registered users on the basis of a result of the comparison. That is, the control unit 170 may determine that a user corresponding to a recognized face is a registered user if the recognized face matches a face image stored in the storage unit 140, or may determine that the user corresponding to the recognized face is an unregistered user if the recognized face does not match a face image stored in the storage unit 140.

When an unregistered user exists among the plurality of users, the control unit 170 notifies that the unregistered user exists through the display unit 180 (operation S109).

In one embodiment, the control unit 170 may control the display unit 180 so that registered users and unregistered users are differently displayed. In detail, the control unit 170 may control the display unit 180 so that faces of the registered users are displayed differently from faces of the unregistered users.

In another embodiment, the control unit 170 may control the display unit 180 so that a notice that an unregistered user exists among the plurality of users is displayed on a message window.

When it is confirmed that all of the plurality of users are registered users, the control unit 170 of the display device 100 checks a viewing state of media content that is being played for each user (operation S111).

In one embodiment, the viewing state of the media content may include a viewing maintaining state in which a recognized user actually views the media content and a not-viewing state in which a recognized user does not view the media content.

In one embodiment, in the case where an image of a recognized user is input to a camera for at least a predetermined period of time, the control unit 170 may ascertain that the recognized user is viewing the media content. In more detail, in the case where the image of the recognized user is input to the camera for at least the predetermined period of time and it is determined that the user gazes at the front side of the display device 100, the control unit 170 may ascertain that the recognized user is viewing the media content.

On the contrary, in the case where the image of the recognized user is not input to the camera for at least the predetermined period of time, the control unit 170 may ascertain that the recognized user is not viewing the media content. For example, in the case where the user disappears from the front side of the display device 100 and a predetermined time elapses, the control unit 170 may ascertain that the recognized user is not viewing the media content.

In another embodiment, in the case where the image of the recognized user is input to the camera for at least the predetermined period of time but it is determined that the user does not gaze at the front side of the display device 100, the control unit 170 may ascertain that the recognized user is not viewing the media content.

The control unit 170 may determine a location at which the user gazes on the basis of the image input through the camera, and may determine whether the user is viewing the media content according to a result of the determination of the location. To this end, the control unit 170 may track the gaze of the user positioned in front of the display device 100, and may determine whether the user is viewing the media content on the basis of the tracked gaze.

When it is confirmed that the plurality of users are viewing the media content on the basis of the viewing state of the media content, the control unit 170 checks whether the viewing content of any one of the plurality of users is changed (operation S113).

In one embodiment, when the viewing state of any one of the plurality of users is changed from the viewing maintaining state to the not-viewing state, the control unit 170 may ascertain that the viewing state of the user is changed.

In another embodiment, when the viewing state of any one of the plurality of users is changed from the not-viewing state to the viewing maintaining state, the control unit 170 may ascertain that the viewing state of the user is changed.

When the viewing state of any one of the plurality of users is changed, the control unit 170 acquires viewing information corresponding to the user of which the viewing state has been changed (operation S115).

In one embodiment, the viewing information may include at least one of media content identification information for identifying media content viewed by the user of which the viewing state has been changed, last viewing time information indicating a time point within the entire playback interval of the media content at which the user most recently viewed the media content, and channel information corresponding to the media content that the user has most recently viewed.

The media content identification information may be, for example, a title of media content.

The last viewing time information may include information about a time point at which the viewing state of the user is changed from the viewing maintaining state to the not-viewing state. That is, in the case where the user views the media content and then moves away from the front of the display device 100 to another place, the control unit 170 may acquire the last viewing time information indicating the time point within the entire playback interval of the media content at which the user most recently viewed the media content.

In one embodiment, while acquiring the viewing information corresponding to the user of which the viewing state has been changed, the control unit 170 may record the media content from a playback time point at which the user most recently viewed the media content. That is, the control unit 170 may record the media content from the time point at which the viewing state of the user is changed from the viewing maintaining state to the not-viewing state.

In another embodiment, while acquiring the viewing information corresponding to the user of which the viewing state has been changed, the control unit 170 may transmit, to a mobile terminal of the user, a viewing inquiry message for inquiring whether to view the media content from the playback time point at which the user most recently viewed the media content.

In another embodiment, while acquiring the viewing information corresponding to the user of which the viewing state has been changed, the control unit 170 may transmit, to the mobile terminal of the user, the media content from the playback time point at which the user most recently viewed the media content. Accordingly, the user may view the media content from the last viewing time point at which the user most recently viewed the media content through the display device 100. This operation will be described later in detail.

The control unit 170 may control the storage unit 140 so that the acquired viewing information is stored.

Thereafter, the control unit 170 checks whether the user of which the viewing state is changed is re-recognized (operation S117). That is, the control unit 170 checks whether the image of the user who has stopped viewing the media content after viewing the media content is re-input through the camera.

In the case where the user of which the viewing state has been changed is re-recognized, the control unit 170 performs a re-viewing function on the basis of the acquired viewing information (operation S119).

Here, the case where the user of which the viewing state has been changed is re-recognized may represent the case where the viewing state of the user is changed back to the viewing maintaining state after being changed from the viewing maintaining state to the not-viewing state.

In one embodiment, the re-viewing function may be a function of starting playback of the media content from the last viewing time point on the basis of the viewing information corresponding to each user.

In another embodiment, the re-viewing function may be a function of switching to a channel viewed at the last viewing time point on the basis of the viewing information corresponding to each user.

A method for operating a display device according to various embodiments will be described with reference to FIGS. 6 to 22.

FIGS. 6 to 9 are diagrams illustrating an example in which a customized service is provided on the basis of the viewing state of the user according to an embodiment.

Regarding FIGS. 6 to 9, it is assumed that all of a plurality of users A, B, C and D are registered users, and the display device 100 plays the media content, i.e., a drama, from a playback start time point (0 minute and 00 second).

Figure 6:
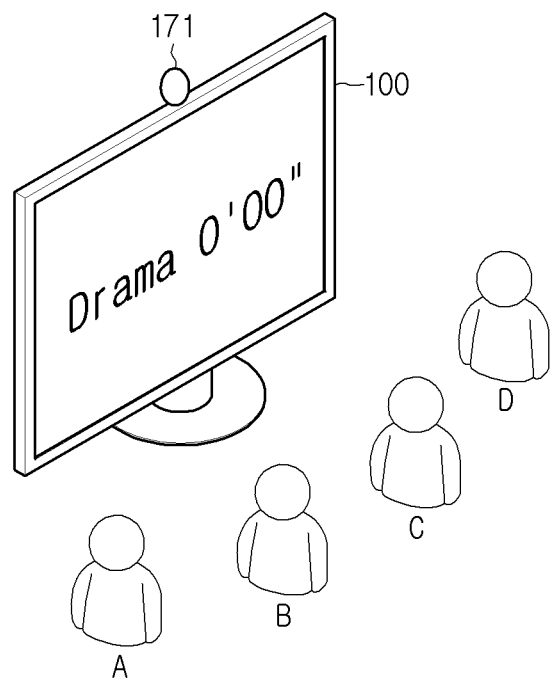
FIGS. 6 to 9 are diagrams illustrating an example in which a customized service is provided on the basis of a viewing state of a user according to an embodiment.

Referring to FIG. 6, the image acquisition unit 171 may acquire an image of the plurality of users A to D positioned in front of the display device 100. The control unit 170 of the display device 100 may extract a plurality of face regions corresponding to the plurality of users A to D on the basis of the image of the plurality of users A to D. The control unit 170 may recognize the plurality of users A to D on the basis of the plurality of extracted face regions and may ascertain that the users are registered users.

The control unit 170 may ascertain that all of the plurality of users A to D are in the viewing maintaining state in which the users are viewing the drama.

Figure 7:
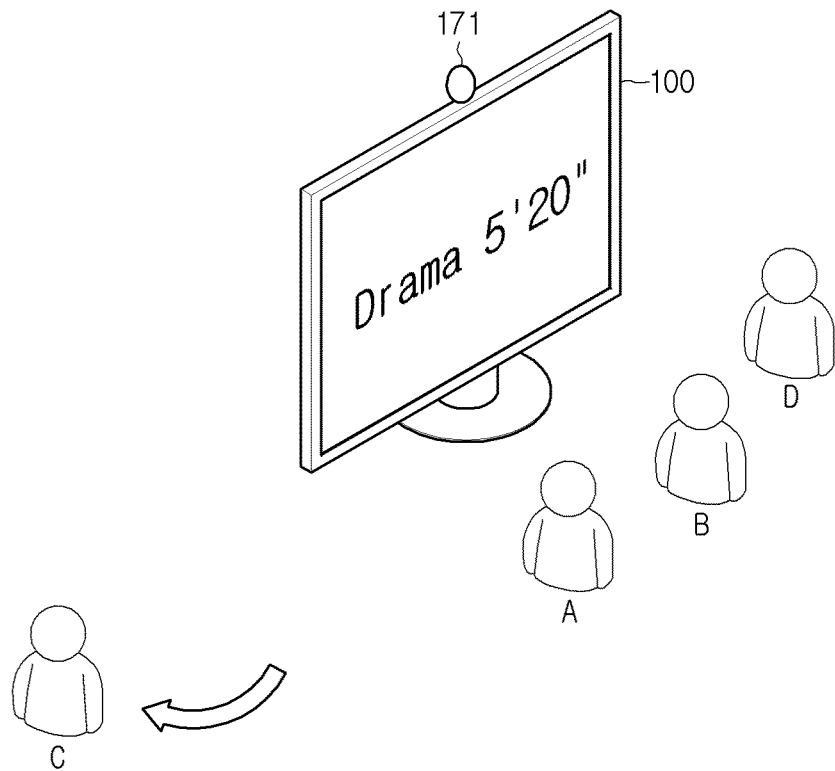

As illustrated in FIG. 7, the user C moves to another place in which the display device 100 is unable to recognize the user C. That is, the control unit 170 may ascertain that the viewing state of the user C is changed from the viewing maintaining state to the not-viewing state. It is assumed that a time point at which the viewing state of the user C is changed from the viewing maintaining state to the not-viewing state corresponds to 5 minutes and 20 seconds within the entire playback interval of the drama.

The control unit 170 may store, in the storage unit 140, the viewing information including the last viewing time point at which the viewing state of the user C is changed and the title of the media content. The control unit 170 may record the media content from the last viewing time point at which the viewing state of the user C is changed.

Figure 8:
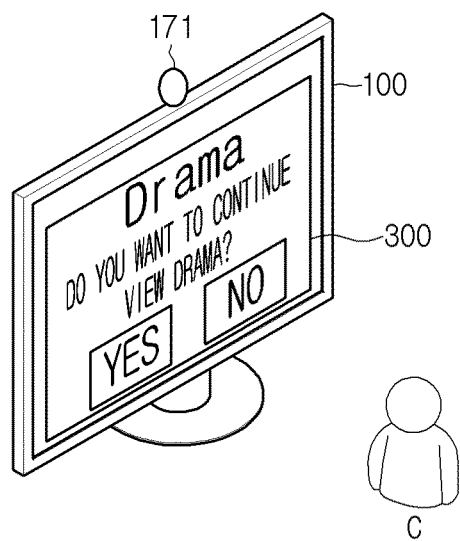

Thereafter, as illustrated in FIG. 8, in the case where the user C is positioned in front of the display device 100 and the display device 100 re-recognizes the user C, the control unit 170 may display, on the basis of the stored viewing information, a resuming inquiry window 300 for inquiring whether to resume viewing the drama from the last playback time point, i.e., 5 minutes and 20 seconds, at which the user C most recently viewed the drama. The user C may view the drama from the last playback time point through the resuming inquiry window 300.

In another embodiment, in the case where the user C is positioned in front of the display device 100, the display device 100 is turned on, and the display device 100 re-recognizes the user C, the control unit 170 may display, on the basis of the stored viewing information, the resuming inquiry window 300 for inquiring whether to resume viewing the drama from the time point at which the user C most recently viewed the drama.

Figure 9:
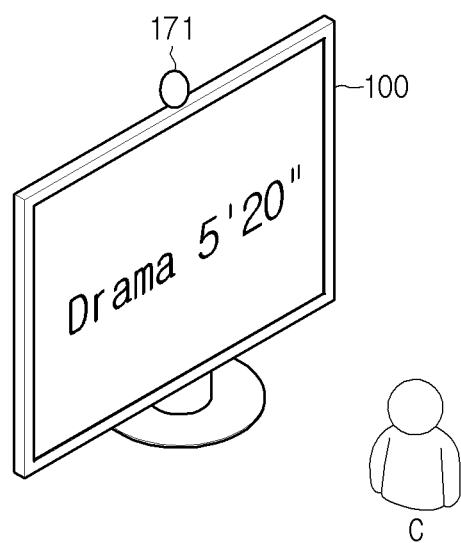

As illustrated in FIG. 9, in the case where the user C is positioned in front of the display device 100 and the display device 100 re-recognizes the user C, the control unit 170 may play, on the basis of the stored viewing information, the drama from the time point, i.e., 5 minutes and 20 seconds, at which the user C most recently viewed the drama.

In another embodiment, in the case where the user C is positioned in front of the display device 100, the display device 100 is turned on, and the display device 100 re-recognizes the user C, the control unit 170 may play, on the basis of the stored viewing information, the drama from the time point at which the user C most recently viewed the drama.

According to the embodiment of FIGS. 6 to 9, the user may easily view the drama from the time point at which the user most recently viewed the drama by virtue of the face recognition process without additionally manipulating a remote controller or inputting a signal through the remote controller.

Next, FIGS. 10 to 14 are described.

FIGS. 10 to 14 are diagrams illustrating an example in which a customized service is provided on the basis of the viewing state of the user according to another embodiment.

Regarding FIGS. 10 to 14, it is assumed that all of a plurality of users A and B are registered users, and the display device 100 plays media content provided from channel number 9.

Figure 10:
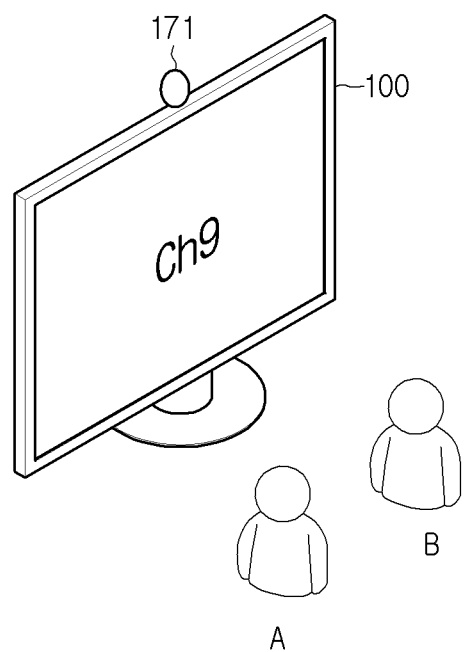
FIGS. 10 to 14 are diagrams illustrating an example in which a customized service is provided on the basis of the viewing state of the user according to another embodiment.

Referring to FIG. 10, the image acquisition unit 171 may acquire an image of the plurality of users A and B positioned in front of the display device 100. The control unit 170 of the display device 100 may extract a plurality of face regions corresponding to the plurality of users A and B on the basis of the image of the plurality of users A and B. The control unit 170 may recognize the plurality of users A and B on the basis of the plurality of extracted face regions and may ascertain that the users are registered users.

The control unit 170 may ascertain that all of the plurality of users A and B are in the viewing maintaining state in which the users are viewing the media content provided from the channel number 9.

Figure 11:
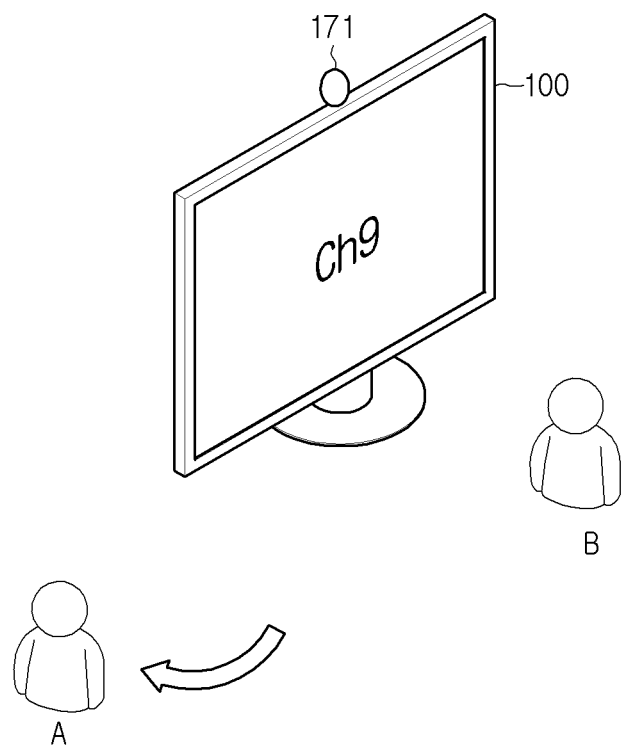

As illustrated in FIG. 11, the user A moves to another place in which the display device 100 is unable to recognize the user A. That is, the control unit 170 may ascertain that the viewing state of the user A is changed from the viewing maintaining state to the not-viewing state.

The control unit 170 may store, in the storage unit 140, the viewing information including a channel number at the last viewing time point at which the viewing state of the user A is changed.

Figure 12:
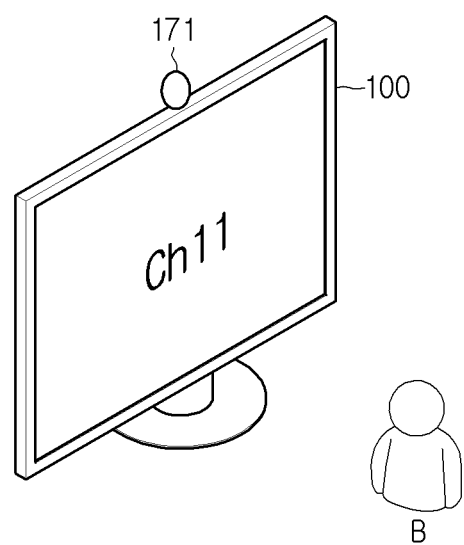

Thereafter, as illustrated in FIG. 12, the user B remaining alone switches the channel and views the media content provided from channel number 11. The user B turns off the display device 100 after viewing the media content provided from the channel number 11. The control unit 170 may store, in the storage unit 140, the viewing information including a channel number at the last viewing time point of the user B.

Figure 13:
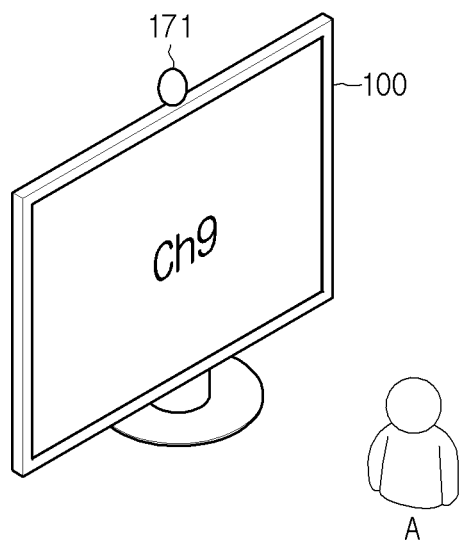

Thereafter, as illustrated in FIG. 13, in the case where the user A is positioned in front of the display device 100, the display device 100 is turned on, and the display device 100 re-recognizes the user A, the control unit 170 may play, on the basis of the stored viewing information, the media content provided from the channel most recently viewed by the user A.

Figure 14:
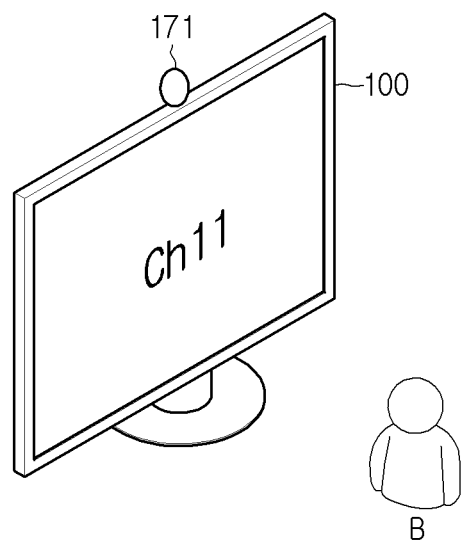

As illustrated in FIG. 14, in the case where the user B is positioned in front of the display device 100, the display device 100 is turned on, and the display device 100 re-recognizes the user B, the control unit 170 may play, on the basis of the stored viewing information, the media content provided from the channel most recently viewed by the user B.

According to the embodiment of FIGS. 10 to 14, the user may easily view the channel corresponding to the time point at which the user most recently viewed the channel by virtue of the face recognition process without additionally manipulating a remote controller or inputting a signal through the remote controller.

Next, FIGS. 15 to 18 are described.

FIGS. 15 to 18 are diagrams illustrating an example in which a customized service is provided on the basis of the viewing state of the user according to another embodiment.

Regarding FIGS. 15 to 18, it is assumed that all of the plurality of users A to D are registered users, and the display device 100 plays the media content, i.e., a drama, from a playback start time point (0 minute and 00 second).

Furthermore, it is assumed that the storage unit 140 of the display device 100 stores information on a plurality of mobile terminals respectively corresponding to the plurality of users A to D.

Furthermore, it is assumed that the display device 100 may exchange information with the mobile terminals of the users using a short-range wireless communication standard such as Bluetooth or Wi-Fi.

Figure 15:
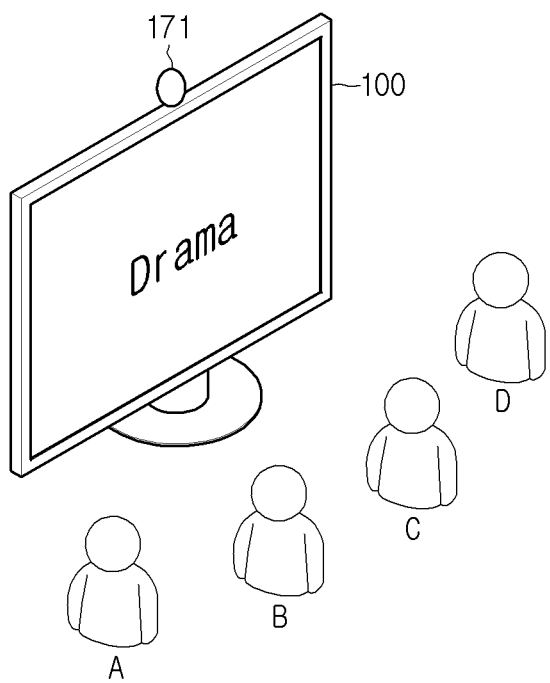
FIGS. 15 to 18 are diagrams illustrating an example in which a customized service is provided on the basis of the viewing state of the user according to another embodiment.

Referring to FIG. 15, the image acquisition unit 171 may acquire an image of the plurality of users A to D positioned in front of the display device 100. The control unit 170 of the display device 100 may extract a plurality of face regions corresponding to the plurality of users A to D on the basis of the image of the plurality of users A to D. The control unit 170 may recognize the plurality of users A to D on the basis of the plurality of extracted face regions and may ascertain that the users are registered users.

The control unit 170 may ascertain that all of the plurality of users A to D are in the viewing maintaining state in which the users are viewing the drama.

Figure 16:
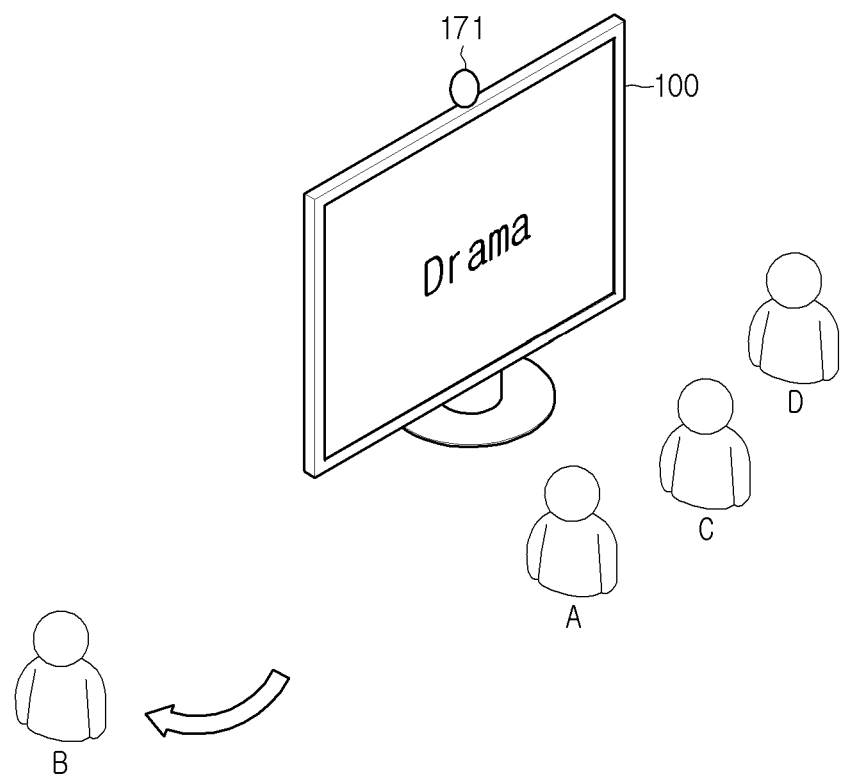

As illustrated in FIG. 16, the user B moves to another place (e.g., a rest room) in which the display device 100 is unable to recognize the user B. That is, the control unit 170 may ascertain that the viewing state of the user B is changed from the viewing maintaining state to the not-viewing state. It is assumed that a time point at which the viewing state of the user B is changed from the viewing maintaining state to the not-viewing state corresponds to 5 minutes and 20 seconds within the entire playback interval of the drama.

The control unit 170 may store, in the storage unit 140, the viewing information including the last viewing time point at which the viewing state of the user B is changed and the title of the media content.

The control unit 170 may transmit, to a mobile terminal 500 of the user B, a message for inquiring of the user B whether to resume viewing the drama from the last viewing time point, i.e., 5 minutes and 20 seconds, on the basis of the viewing information corresponding to the user B. A time point at which the message for inquiring whether to resume viewing the drama is transmitted may be the time point at which the viewing state of the user B is changed from the viewing maintaining state to the not-viewing state.

Figure 17:
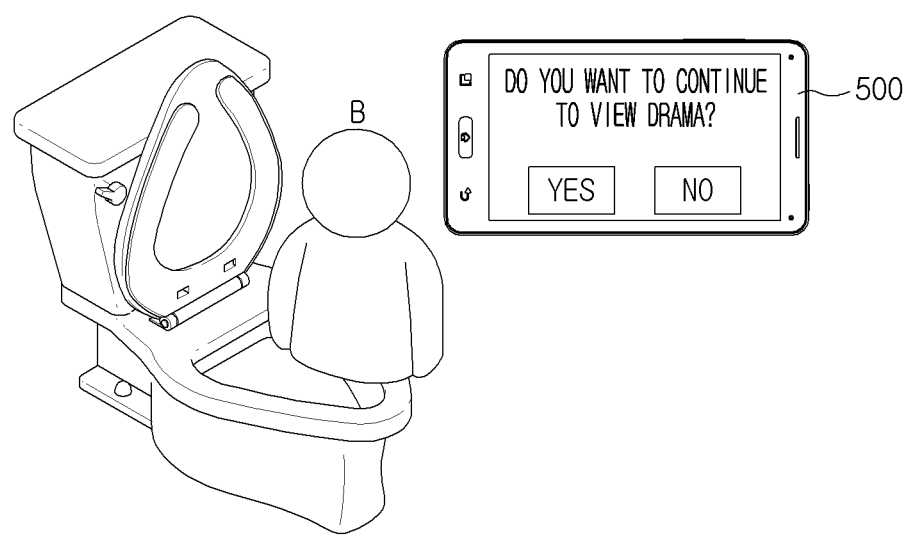

As illustrated in FIG. 17, the user B who has moved to a rest room may check a window of the message displayed on the mobile terminal 500, and may view the drama from the last viewing time point corresponding to the user B through the window of the message. When a resuming approval command is received from the mobile terminal 500, the display device 100 may transmit data of the drama from the last viewing time point. The user may view the drama from the last viewing time point through the mobile terminal 500.

Figure 18:
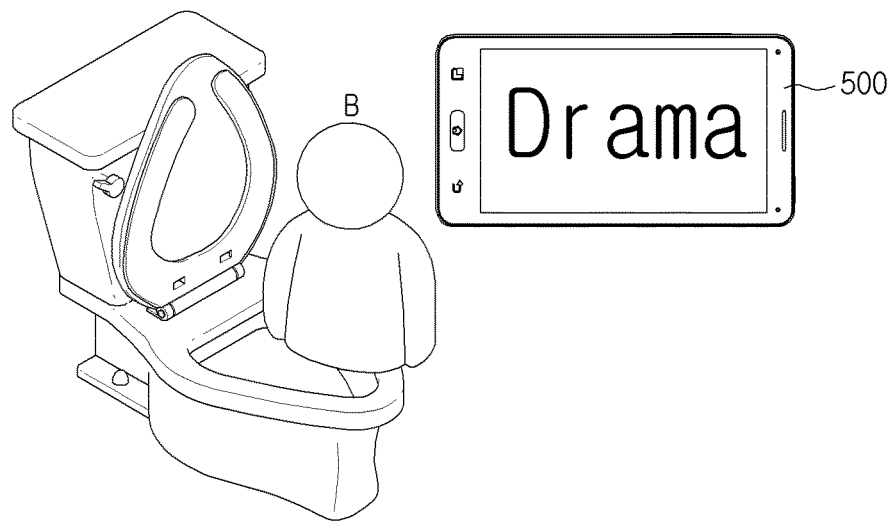

As illustrated in FIG. 18, in the case where the user B is positioned in front of the display device 100 and the display device 100 re-recognizes the user B, the control unit 170 may transmit, on the basis of the stored viewing information, content data of the drama from the time point at which the user B most recently viewed the drama. The mobile terminal 500 of the user B may play the drama from the last viewing time point of the user B using the content data of the drama received from the display device 100.

According to the embodiment of FIGS. 15 to 18, the user may easily resume viewing the media content, through the mobile terminal, from the time point at which the user most recently viewed the media content through a TV.

Next, FIGS. 19 to 22 are described.

FIGS. 19 to 22 are diagrams illustrating an example in which a customized service is provided on the basis of the viewing state of the user according to another embodiment.

Regarding FIGS. 19 to 22, it is assumed that all of the plurality of users A and B are registered users, and the display device 100 plays media content.

Figure 19:
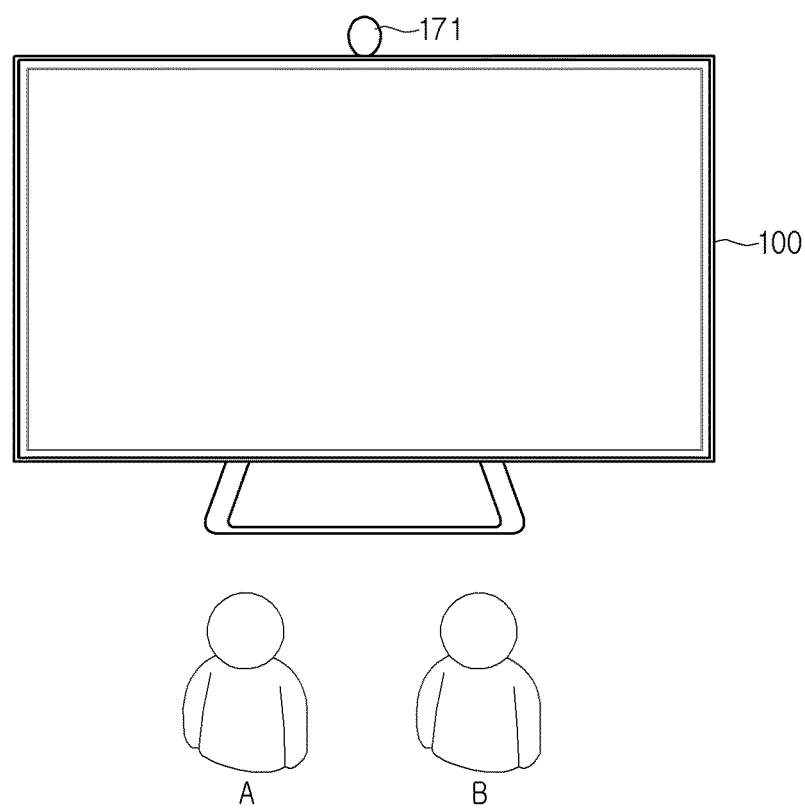

Referring to FIG. 19, the image acquisition unit 171 may acquire an image of the plurality of users A and B positioned in front of the display device 100. The control unit 170 of the display device 100 may extract a plurality of face regions corresponding to the plurality of users A and B on the basis of the image of the plurality of users A and B. The control unit 170 may recognize the plurality of users A and B on the basis of the plurality of extracted face regions and may ascertain that the users are registered users.

The control unit 170 may ascertain that all of the plurality of users A and B are in the viewing maintaining state in which the users are viewing the media content.

Figure 20:
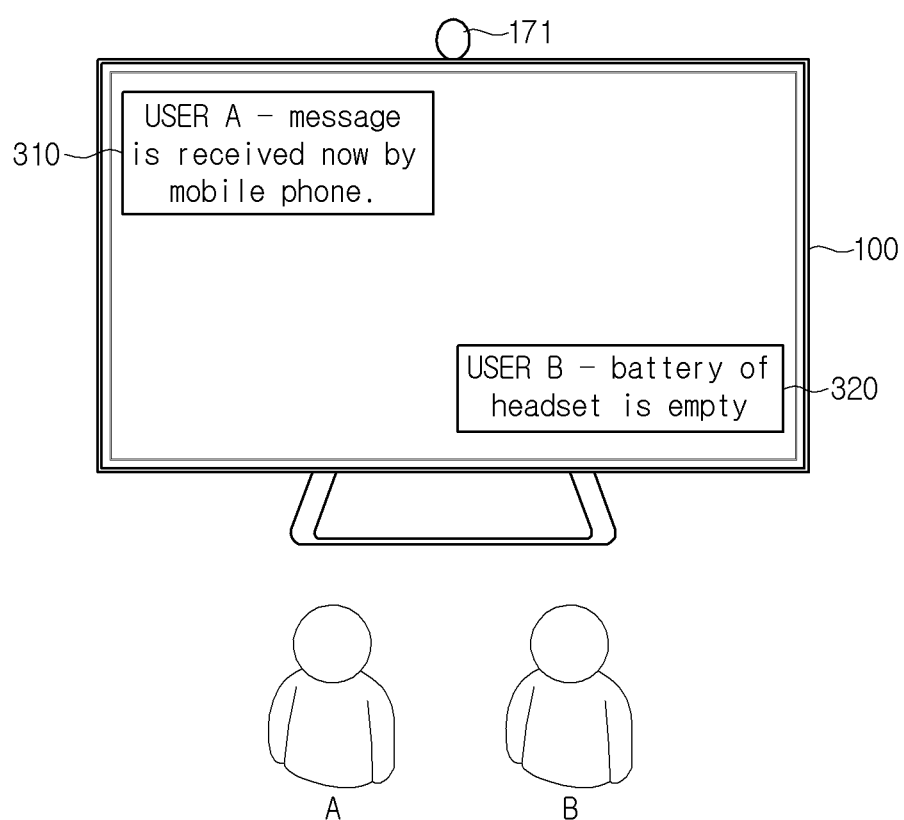

When the control unit 170 ascertains that all of the plurality of users A and B are in the viewing maintaining state, the display device 100 may provide information on a plurality of mobile terminals respectively corresponding to the plurality of users A and B, as illustrated in FIG. 20. The storage unit 140 of the display device 100 may store the information on the mobile terminal corresponding to the user A and the information on the mobile terminal corresponding to the user B. The display device 100 and the mobile terminals of the users may exchange information by virtue of short-range wireless communication.

When the plurality of users A and B are recognized, the control unit 170 may receive, from the mobile terminals corresponding to the users, the information on the mobile terminals of the users and may display the information. For example, in the case where the mobile terminal corresponding to the user A is a mobile phone and the user A is recognized, the control unit 170 may display, on a first information window 310, information indicating that the mobile phone has received a text message. In the case where the mobile terminal corresponding to the user B is a Bluetooth headset and the user B is recognized, the control unit 170 may display, on a second information window 320, information indicating that a capacity of a battery of the Bluetooth headset is low. The first information window 310 and the second information window 320 may be simultaneously displayed while the media content is played.

Figure 21:
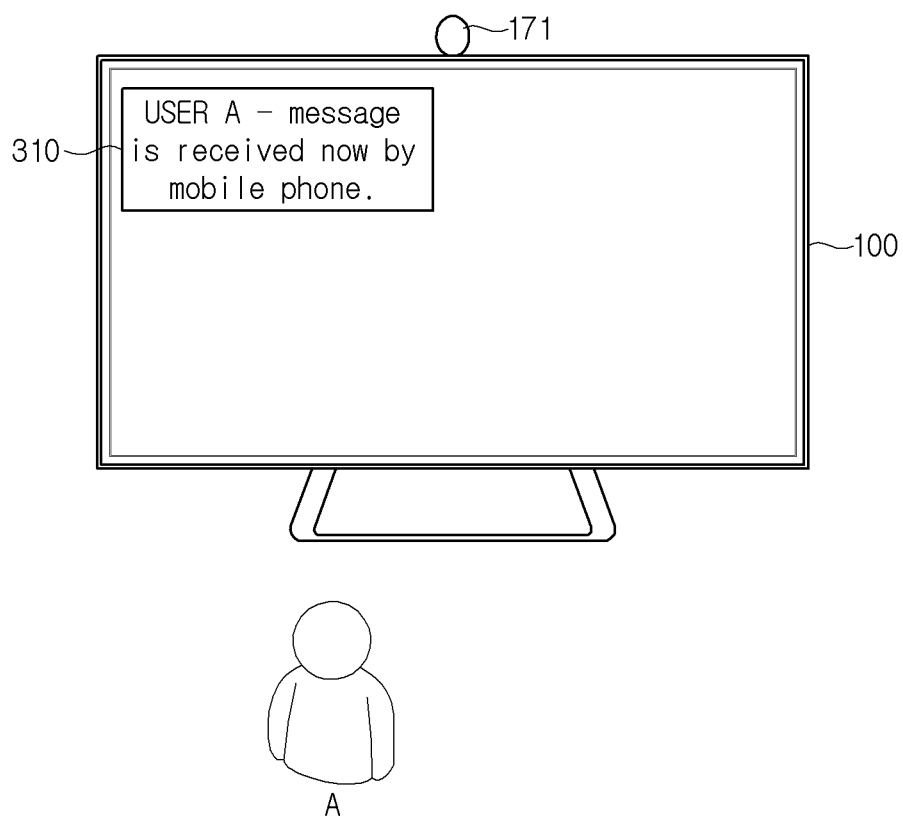

As illustrated in FIG. 21, in the case where the viewing state of the user B is changed from the viewing maintaining state to the not-viewing state, the control unit 170 may receive, from the mobile terminal corresponding to the user A, the information on the mobile terminal and may display the received information on the mobile terminal on the first information window 310.

As illustrated in FIG. 22, in the case where the viewing state of the user A is changed from the viewing maintaining state to the not-viewing state, the control unit 170 may receive, from the mobile terminal corresponding to the user B, the information on the mobile terminal and may display the received information on the mobile terminal on the second information window 320.

According to the embodiment of FIGS. 19 to 22, the user may easily check the information on the mobile terminal of the user by virtue of the face recognition process without additionally manipulating a remote controller or inputting a signal through the remote controller.

Next, FIGS. 23 to 26 are described.

FIGS. 23 to 26 are diagrams illustrating an example in which a customized service is provided on the basis of the viewing state of the user according to another embodiment.

Regarding FIGS. 23 to 26, it is assumed that all of the plurality of users A and B are registered users, and the display device 100 plays a drama broadcast on channel 13.

Figure 23:
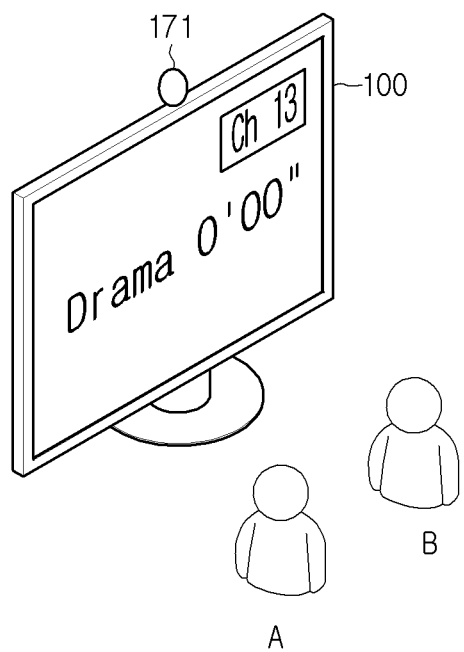

Referring to FIG. 23, the image acquisition unit 171 may acquire an image of the plurality of users A and B positioned in front of the display device 100. The control unit 170 of the display device 100 may extract a plurality of face regions corresponding to the plurality of users A and B on the basis of the image of the plurality of users A and B. The control unit 170 may recognize the plurality of users A and B on the basis of the plurality of extracted face regions and may ascertain that the users are registered users.

The control unit 170 may ascertain that all of the plurality of users A and B are in the viewing maintaining state in which the users are viewing the drama from the time point of 0 minute and 0 second.

Figure 24:
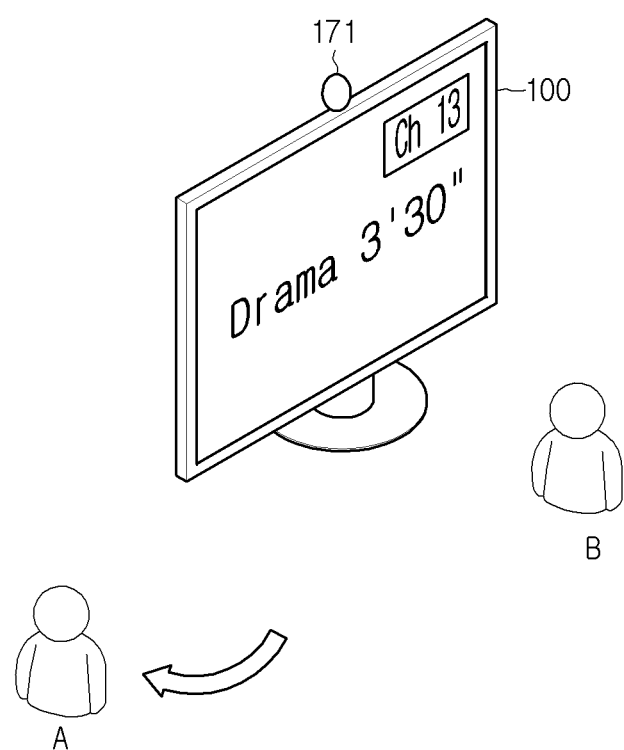

As illustrated in FIG. 24, the user A moves to another place in which the display device 100 is unable to recognize the user A. That is, the control unit 170 may ascertain that the viewing state of the user A is changed from the viewing maintaining state to the not-viewing state. The control unit 170 may store, in the storage unit 140, first viewing information corresponding to the user A at a first absence time point at which the viewing state of the user A is changed from the viewing maintaining state to the not-viewing state. Here, the first absence time point may correspond to 3 minutes and 30 seconds within the entire playback interval of the drama. Furthermore, the first viewing information may include a last playback time point (3 minutes and 30 seconds) at which the user most recently viewed the drama, the title of the drama, and information on a channel on which the drama is broadcast.

As illustrated in FIG. 25, the user B moves to another place in which the display device 100 is unable to recognize the user B. That is, the control unit 170 may ascertain that the viewing state of the user B is changed from the viewing maintaining state to the not-viewing state. The control unit 170 may store, in the storage unit 140, second viewing information corresponding to the user B at a second absence time point at which the viewing state of the user B is changed from the viewing maintaining state to the not-viewing state. Here, the second absence time point may correspond to 7 minutes and 20 seconds within the entire playback interval of the drama. Furthermore, the second viewing information may include the last playback time point (7 minutes and 20 seconds) at which the user B most recently viewed the drama, the title of the drama, and the information on the channel on which the drama is broadcast.

Figure 26:
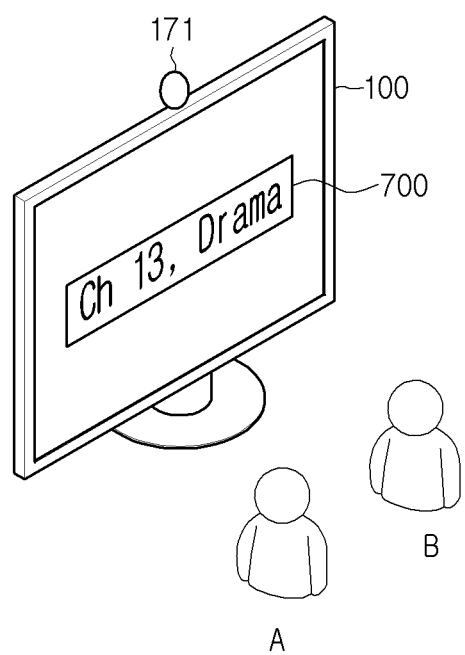

Thereafter, as illustrated in FIG. 26, in the case where the users A and B are simultaneously re-recognized by the image acquisition unit 171, the control unit 170 may provide common information on the basis of the stored first and second viewing information. In detail, the control unit 170 may compare the first viewing information corresponding to the user A with the second viewing information corresponding to the user B, and may display, on the display unit 180, information commonly included in the first information and the second information according to a result of the comparison. For example, in the case where the user A and the user B are re-recognized, the control unit 170 may display, on a popup window 700, the title of the drama and the channel information commonly included in the first viewing information and the second viewing information.

According to the embodiment of FIGS. 23 to 26, in the case where the absence time point of the user A is different from that of the user B and the user A and the user B are simultaneously re-recognized, the information commonly included in the viewing information of the users may be provided. Therefore, even though the user A and the user B are simultaneously re-recognized, confusion about performing the re-viewing function with respect to which one of the users may be avoided.

According to an embodiment, the above-mentioned method may be implemented as processor-readable codes in a program-recorded medium. A processor-readable recording medium includes, for example, a ROM, a RAM, a CD-ROM, a magnetic tape, a floppy disk, and an optical data storage device, and may also be implemented in the form of a carrier wave (for example, transmission through the Internet).

The above-mentioned display device is not limited to the configurations and methods of the above-mentioned embodiments. The entirety or a part of each embodiment may be selectively combined with each other to make various modifications.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for operating a display device, comprising:
    acquiring an image of a plurality of users, wherein the plurality of users comprises a first user and a second user;
    recognizing a plurality of faces respectively corresponding to the plurality of users from the acquired image;
    checking a viewing state of media content for each user, if the plurality of users respectively corresponding to the plurality of recognized faces are registered users;
    acquiring viewing information corresponding to at least one of the plurality of registered users of which the viewing state has been changed from a viewing maintaining state in which the media content is viewed to a not-viewing state in which the media content is not viewed, wherein the viewing information comprises information on a channel corresponding to the media content, a title of the media content and a last viewing time point indicating a time point in an entire playback interval of the media content of which a user that has a viewing state that has been changed most recently viewed the media content;
    receiving information related to a state of a mobile terminal corresponding to the first user, if the viewing state of the second user has been changed from the viewing maintaining state to the not-viewing state and the viewing state of the first user keeps the viewing maintaining state;
    storing the acquired viewing information and the received information related to the state of the mobile terminal in an account of the first user;
    displaying the received information related to the state of the mobile terminal and the media content simultaneously;
    comparing the acquired first viewing information corresponding to the first user with the acquired second viewing information corresponding to the second user if a face of the first user of which the viewing state has been changed and a face of the second user which the viewing state has been changed are simultaneously re-recognized; and
    displaying common information according to a result of the comparison, wherein the common information is information commonly included in the first viewing information and the second viewing information.

2. The method according to claim 1, further comprising performing a re-viewing function based on the acquired viewing information by accessing the account of the at least one of the plurality of registered users of which the viewing state has been changed from the not-viewing state to the viewing maintaining state, wherein the performing the re-viewing function comprises playing the media content from the last viewing time point when the face of the user of which the viewing state has been changed is re-recognized.

3. The method according to claim 2, wherein the performing the re-viewing function comprises recording the media content from the last viewing time point and playing the media content recorded from the last viewing time point when the face of the user of which the viewing state has been changed is re-recognized.

4. The method according to claim 2, wherein the performing the re-viewing function comprises:
    displaying a resuming inquiry window for inquiring whether to play the media content from the last viewing time point when the face of the user of which the viewing state has been changed is re-recognized; and
    playing the media content in response to a request for playing the media content from the last viewing time point through the resuming inquiry window.

5. The method according to claim 1, wherein the acquiring the viewing information corresponding to at least one of the plurality of registered users of which the viewing state has been changed comprises storing channels corresponding to the media content that each of the at least one of the plurality of registered users most recently viewed, in association with the plurality of faces respectively, and
    wherein the performing the re-viewing function comprises switching, when the face of the user of which the viewing state has been changed is re-recognized, a current channel to a channel corresponding to the re-recognized face of the user.

6. The method according to claim 2, further comprising transmitting, by the display device, a message for inquiring whether to resume viewing the media content from the last viewing time point to the mobile terminal of the user of which the viewing state has been changed.

7. The method according to claim 6, further comprising transmitting, by the display device, the media content from the last viewing time point to the mobile terminal, upon receiving an approval command for the message.

8. A display device comprising:
    a display unit;
    a camera unit configured to acquire an image of a plurality of users, wherein the plurality of users comprises a first user and a second user;
    an external device interface unit configured to receive information related to a state of a mobile terminal corresponding to the plurality of users; and a controller configured to:
recognize a plurality of faces respectively corresponding to the plurality of users from the acquired image,
check a viewing state of media content for each user, if the plurality of users respectively corresponding to the plurality of recognized faces are registered users,
acquire viewing information corresponding to at least one of the plurality of registered users of which the viewing state has been changed from a viewing maintaining state in which the media content is viewed to a not-viewing state in which the media content is not viewed, wherein the viewing information comprises information on a channel corresponding to the media content, a title of the media content and a last viewing time point indicating a time point in an entire playback interval of the media content of which a user that has a viewing state that has been changed most recently viewed the media content,
receive information related to a state of a mobile terminal corresponding to the first user, if the viewing state of the second user has been changed from the viewing maintaining state to the not-viewing state and the viewing state of the first user keeps the viewing maintaining state,
store the acquired viewing information and the received information related to the state of the mobile terminal in an account of the at least one of the plurality of registered users,
display the received information related to the state of the mobile terminal and the media content simultaneously,
compare the acquired first viewing information corresponding to the first user with the acquired second viewing information corresponding to the second user if a face of the first user of which the viewing state has been changed and a face of the second user which the viewing state has been changed are simultaneously re-recognized, and
display common information according to a result of the comparison, wherein the common information is information commonly included in the first viewing information and the second viewing information.

9. The display device according to claim 8, wherein the controller plays the media content from the last viewing time point when the face of the user of which the viewing state has been re-recognized.

10. The display device according to claim 9, wherein the controller records the media content from the last viewing time point and plays the media content recorded from the last viewing time point when the face of the user of which the viewing state has been changed is re-recognized.

11. The display device according to claim 9, wherein the controller controls the display unit so as to display a resuming inquiry window for inquiring whether to play the media content from the last viewing time point when the face of the user of which the viewing state has been changed is re-recognized, and plays the media content in response to a request for playing the media content from the last viewing time point through the resuming inquiry window.

12. The display device according to claim 8, further comprising:
a storage configured to store channels corresponding to the media content that each of the at least one of the plurality of registered users most recently viewed, in association with the plurality of faces respectively,
wherein the controller searches, when the face of the user of which the viewing state has been changed is re-recognized, the storage so as to switch a current channel to a channel corresponding to the re-recognized face of the user.

13. The display device according to claim 8, wherein the controller transmits a message for inquiring whether to resume viewing the media content from the last viewing time point to a mobile terminal of the user of which the viewing state has been changed.

14. The display device according to claim 13, wherein the controller transmits the media content from the last viewing time point to the mobile terminal, upon receiving an approval command for the message.

15. The display device according to claim 8, wherein the controller stores, in a storage, first viewing information corresponding to the first user at a first absence time point at which the viewing state of the first user is changed from the viewing maintaining state to the not-viewing state, and stores, in the storage, second viewing information corresponding to the second user at a second absence time point at which the viewing state of the second user is changed from the viewing maintaining state to the not-viewing state, and
wherein the first absence time point is different from the second absence time point.

* * * * *